United States Patent
Cazals et al.

(10) Patent No.: US 9,318,292 B2
(45) Date of Patent: *Apr. 19, 2016

(54) METHOD FOR EVALUATING THE MECHANICAL PERFORMANCES OF A SWITCHGEAR DEVICE

(71) Applicant: Schneider Electric Industries SAS, Rueil-Malmaison (FR)

(72) Inventors: François Cazals, Claix (FR); Jean-Pierre Nereau, Seyssinet (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 332 days.

This patent is subject to a terminal disclaimer.

(21) Appl. No.: 13/673,222

(22) Filed: Nov. 9, 2012

(65) Prior Publication Data

US 2013/0134982 A1    May 30, 2013

(30) Foreign Application Priority Data

Nov. 28, 2011    (FR) .................................... 11 03623

(51) Int. Cl.
| | |
|---|---|
| *G01R 3/00* | (2006.01) |
| *H01H 1/50* | (2006.01) |
| *H01H 71/04* | (2006.01) |
| *G01D 5/04* | (2006.01) |
| *G01D 5/12* | (2006.01) |

(Continued)

(52) U.S. Cl.
CPC ................ *H01H 71/04* (2013.01); *G01D 5/04* (2013.01); *G01D 5/12* (2013.01); *H01H 11/0062* (2013.01); *H01H 71/505* (2013.01); *H01H 2071/044* (2013.01)

(58) Field of Classification Search
CPC . H01H 71/04; H01H 11/0062; H01H 71/505; H01H 2071/044; G01D 5/12
USPC ........ 324/415, 261, 272.19; 702/34; 200/252, 200/260
See application file for complete search history.

(56) References Cited

U.S. PATENT DOCUMENTS

| | | | |
|---|---|---|---|
| 4,713,508 A | 12/1987 | Baginski et al. | |
| 5,731,560 A | 3/1998 | Nebon et al. | |

(Continued)

FOREIGN PATENT DOCUMENTS

| | | |
|---|---|---|
| DE | 195 04 714 A1 | 8/1996 |
| EP | 0 222 645 A1 | 5/1987 |

(Continued)

*Primary Examiner* — Melissa Koval
*Assistant Examiner* — Farhana Hoque
(74) *Attorney, Agent, or Firm* — Steptoe & Johnson LLP (57) ABSTRACT

A method for evaluating mechanical performance of a switchgear device having at least one pole which includes a pair of contacts movable between open and closed positions, a support arm of a first contact, a support arm drive including a rotary pole shaft and a rod pivotably coupling the drive to the support, an energy storage system for moving the arm to close the contacts, and a toggle device with a trip latch, the method including measuring the angle of rotation of the pole shaft during contact closing, deriving specific values by measuring the angle of rotation, comparing the values with an initial reference value, identifying wear performances of the drive by comparing the specific values with the reference value, determining first and second specific values on a variation curve of the angle of rotation, calculating the angular difference between maximum and final angles of rotation; and identifying a latching state of the toggle device as a function of the angular difference.

4 Claims, 6 Drawing Sheets

(51) Int. Cl.
*H01H 11/00* (2006.01)
*H01H 71/50* (2006.01)

(56) References Cited

U.S. PATENT DOCUMENTS 6,184,483 B1 * 2/2001 Coudert et al. ............ 200/50.21
6,777,635 B2    8/2004 Baginski et al.
2010/0076697 A1 *  3/2010 Wagner et al. .................. 702/34
2010/0288606 A1 * 11/2010 Rival .................... H01H 1/0015
                                                       200/260

FOREIGN PATENT DOCUMENTS

| EP | 0 789 390 A1 | 8/1997 |
| EP | 1 347 479 A1 | 9/2003 |

* cited by examiner

METHOD FOR EVALUATING THE MECHANICAL PERFORMANCES OF A SWITCHGEAR DEVICE

BACKGROUND OF THE INVENTION

The invention relates to a method for evaluating the mechanical performances of a switchgear device comprising at least one pole. Each pole comprises a pair of main contacts movable with respect to one another between an open position and a closed position. A drive mechanism of a support arm of a first main contact comprises a rotary pole shaft and at least one rod coupling the drive mechanism to the support arm in pivoting manner. Said mechanism comprises an energy storage system designed to cause movement of said arm to place the main contacts in a closed position.

The invention also relates to a switchgear device for implementation of said method.

STATE OF THE ART

A power supply line of an electric load to be controlled is conventionally provided with at least one switchgear device which, for each phase, comprises pairs of contacts movable with respect to one another to switch the load. Actuation of the contacts can be performed in different manners; in particular, for certain high-power switchgear devices (in particular more than 600 A), used for example for safety purposes as line incomer, a high electrodynamic strength is required and the contacts are driven by a lever system coupled to a rotary spindle, itself actuated by a toggle mechanism with two pivoting rods, as described for example in EP 0,222,645, EP 0,789,380 or EP 1,347,479.

One cause of malfunctioning of known switchgear devices concerns the toggle actuating mechanism described above. This actuating mechanism also called OCO (open-closed-open) mechanism, is moved by a spring-loaded mechanical actuator. This spring-loaded mechanism also called "grenade" mechanism is thus used to perform closing of the circuit breaker. This "grenade" mechanism provides the necessary energy for the OCO mechanism and also enables an operator to perform operations on the circuit breaker in total safety. Use of the latter does in fact limit the risks of exposure linked to the presence of an electric arc in case of incorrect closing. The switchgear device generally comprises a motor for resetting the "grenade" mechanism. Said motor is actuated as from the end of the closing phase of the OCO mechanism to set the "grenade" mechanism.

This "grenade" mechanism can present operating faults in the course of its use in time. A decrease of the energy performances of the "grenade" mechanism is liable to be responsible for incomplete closing of the OCO mechanism. The reasons for malfunctioning of the "grenade" mechanism are multiple. They can in particular be related to a slackening of the springs of the "grenade" mechanism, an increase of the mechanical frictions of the kinematic chain of the different moving parts in the circuit breaker, or an increase of the resistive torque on the bar of the circuit breaker.

If the action of the "grenade" mechanism is not sufficient to operate the OCO mechanism, the switchgear device can nevertheless be in a closed position while at the same time not being latched. The toggle of the OCO mechanism does in fact unfold due to the action of the "grenade" but does not overshoot its operation dead point. The circuit breaker is then closed while not being latched and can have a current flowing through it. In the latter position, the "grenade" mechanism performs holding of the OCO mechanism in a closed position, whereas in an operation called "normal operation", the OCO mechanism has to latch in autonomous manner on a stop. In the particular case of the described embodiment, the toggle mechanism passing the dead point brings the OCO mechanism up against a stop in the closed position. If the circuit breaker is in a closed non-latched state and the resetting motor is actuated, the switchgear device is then in a phase called slow opening phase, a phase which is to be totally prohibited. Indeed, as the OCO mechanism is no longer secured by the "grenade" mechanism during resetting, said OCO mechanism tends to open in spontaneous manner. An electric arc can then occur and represent a risk for the circuit breaker causing "explosion" of the latter.

SUMMARY OF THE INVENTION

The object of the invention is therefore to remedy the shortcomings of the state of the art, so as to propose a diagnostic method for evaluating the mechanical performances of a switchgear device, in particular of the toggle mechanism.

The method according to the invention consists in measuring the angle of rotation of the pole shaft during a closing time of the contacts and in reconstituting at least two specific values from the measurements. Said specific values are then compared with a specific initial operating reference of the switchgear device to diagnose the mechanical wear performances of the drive mechanism according to a comparative state between the specific values obtained and those of the operating reference.

According to a preferred embodiment of the invention, the method consists in determining a first specific value on a curve of the variation of the angle of rotation corresponding to a time necessary to reach a first local maximum on the variation curve. Said first local maximum corresponds to the maximum angle of rotation maximum reached by the pole shaft in the course of closing. A second specific value on the variation curve of the angle of rotation is determined and corresponds to a final angle of rotation reached when the pair of movable main contacts are in a closed position. The angular difference between the maximum angle of rotation and the final angle of rotation is calculated to diagnose a latching state of a toggle device of the drive mechanism of the pole shaft according to said angular difference.

According to a particular embodiment of the invention, the method consists in determining a third specific value equal to a first time necessary to reach a first inflection point on a variation curve of the angle of rotation. Said inflection point corresponds to the moment when the pole shaft reaches a maximum speed of rotation. A fourth specific value equal to a second time necessary to reach a point on the variation curve is determined. This second point corresponds to a theoretical final angle of rotation reached when the pair of contacts are in a closed position. The elapsed time between the first and second times is calculated to diagnose an excess energy level of the energy storage system of the drive mechanism according to the difference between the value of the calculated elapsed time and a theoretical value.

The switchgear device for implementation of the method as defined above comprises a pair of movable contacts able to move with respect to one another between an open position and a closed position. A drive mechanism of the support arm of a first contact comprising a rotary pole shaft and at least one rod couple the drive mechanism in pivoting manner to the support arm. An energy storage system is provided to cause movement of said arm to place the main contacts in a closed position. The switchgear device comprises a plurality of identical poles and a pole shaft common to all the poles, the pole shaft being the rotary spindle of the drive mechanisms.

Preferably, the support arm comprises a first part supporting the first contact and a second part, the two parts sliding with respect to one another so that, in the closed position of the pair of contacts, the second part can take a first abutment position and a second end-of-travel position in which the first part is sunk into the second part.

According to a mode of development of the switchgear device, the drive mechanism of the pole shaft comprises a resetting device having an energy storage system with a flexible device comprising at least one closing spring to move the movable contact to the closed position, loading of the closing spring being performed by a resetting cam driven in rotation by means of a manual lever or a servomotor.

Preferably, the drive mechanism of the pole shaft comprises a toggle device associated with a trip latch and with an opening spring to move the support arm of the movable contact, the device comprising two rods.

The switchgear device comprises means for determining the angle of rotation of the pole shaft, said means comprising a rotation sensor one component of which is arranged on the pole shaft.

According to a particular embodiment, the rotation sensor comprises magnetic means arranged on the axis of rotation and detection means fitted on the case of the switchgear device, the magnetic means and the detection means communicating without any contact.

According to a particular embodiment, the rotation sensor comprises a cog-wheel arranged on the axis of rotation and detection means fitted on the case of the switchgear device, the cog-wheel and the detection means communicating without any contact.

BRIEF DESCRIPTION OF THE DRAWINGS

Other advantages and features will become more clearly apparent from the following description of particular embodiments of the invention, given for illustrative and non-restrictive example purposes only, represented in the appended drawings.

DETAILED DESCRIPTION OF A PREFERRED EMBODIMENT

Figure 1:
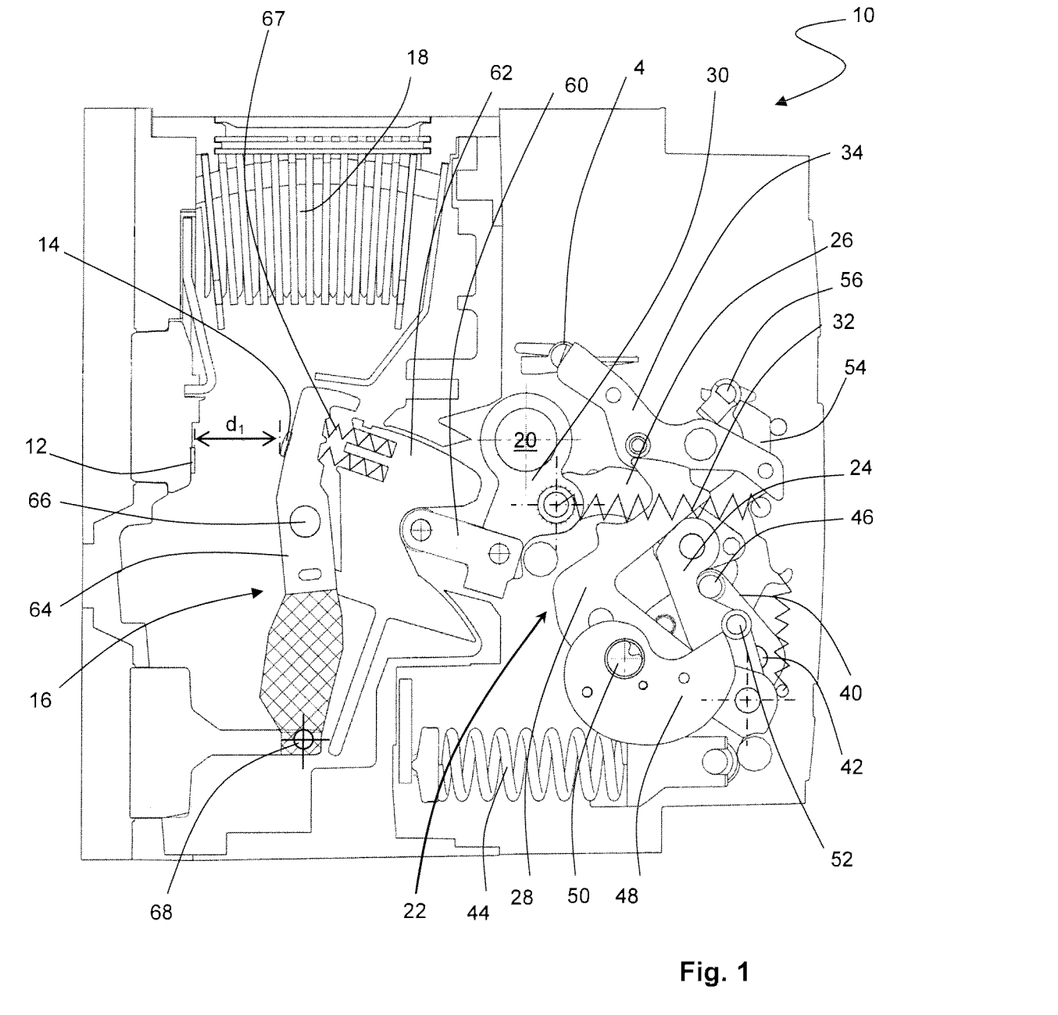
FIG. 1 illustrates a switchgear device for implementation of the method according to the invention.
Figure 2:
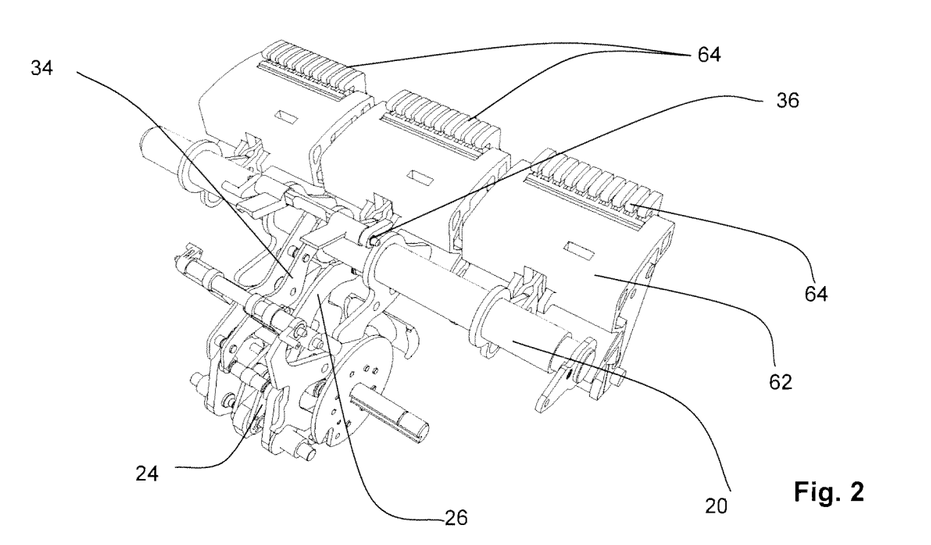
FIG. 2 represents a detailed perspective view of the actuating mechanism of a switchgear device according to FIG. 1.

With reference to FIG. 1, a switchgear device 10 for high currents, above 600 A, in conventional manner comprises a pair of electric contacts 12, 14 for each pole. Each electric contact is preferably associated with a pad made from suitable material, for example a silver-based alloy. One of the contacts 14 is fitted on an arm 16 able to pivot between an open position in which it is separated from the stationary contact 12 and a closed position in which mechanical and electric contact between the contacts 12, 14 is established. The pole also comprises an arc extinguishing chamber 18 and a pair of main terminals (not illustrated) designed to connect onto connection strips. For these high ranges, the switchgear device 10 comprises a plurality of poles arranged in parallel planes, perpendicular to a pole shaft 20 which is common thereto: the closing or opening order of the poles is transmitted to each movable contact 14 from the pole shaft 20 by means of a drive mechanism 22 with a lever (FIG. 2).

The pole shaft 20 is mounted rotating on the case of the switchgear apparatus 10 and is actuated by suitable means. In particular, for open switchgear devices 10 with an intermediate pole shaft 20 and high electrodynamic strength, the drive mechanism 22 is of the toggle type, with two rods 24, 26 pivoting with respect to one another. One of the rods 24 is articulated in rotation on a trip latch 28 mounted pivoting on a fixed spindle; the other rod 26 is mechanically coupled to a crank 30 of the pole shaft 20, which is also common to the set of poles and further forms one of the levers of the drive mechanism 22 of the electric contacts.

An opening spring 32 is anchored between the crank 30 and a fixed securing pin, and biases the crank 30 to its open position. An opening ratchet 34, formed by a lever pivoting around a fixed spindle, is controlled by an opening latch 36 in the shape of a half-moon; the opening ratchet 34 is biased by a spring towards the trip latch 28, moving away from the half-moon 36. A roller is arranged on the opening ratchet 34 between the ends of the latter to collaborate with a V-shaped recess of the trip latch 28, which is biased by a spring (not shown) tending to shorten the distance between the articulation axis of the toggle mechanism 24, 26 on the trip latch 28 and the articulation axis of the toggle mechanism on the crank 30.

In a preferred embodiment, the switchgear device 10 is able to be reset, i.e. it is provided with energy storage means so as to assist the closing function, such as for example a "grenade" mechanism as described in the document EP 0,222,645. In particular, a drive lever 40 is mounted pivoting around a fixed spindle 42, and a flexible energy storage device comprising at least one closing spring 44 is mounted pivoting on a fixed point and on a finger of the drive lever 40. The drive lever 40 supports a roller 52 designed to collaborate with a loading cam 48 keyed onto a shaft 50. The roller 52 is designed to collaborate with a closing ratchet 54 pivoting around a fixed spindle. A closing latch 56, designed to latch the ratchet 54, is flexibly biased by a spring to its closed position; the ratchet 54 is itself biased by a spring to its latched position.

The pole shaft 20 is actuated by means of these different elements and then drives the movable contacts 14. For this purpose, its crank 30 is provided with a connecting rod 60, for each pole, which connects it to the support arm 16 of the movable contact 14. The support arm 16 is provided with two parts sliding with respect to one another: a pole cage 62 is moved directly by the rod 60 with respect to which it is pivotally mounted. The part 64 of the arm 16 which bears the contact pad 14 slides inside the pole cage 62, preferably in articulated manner around a spindle 66. Means forming a spring 67, for example one or more contact pressure springs, arranged between the support 64 and the pole cage 62, urge the pad 14 to the salient position with respect to the cage. This configuration enables a closing over-travel of the contact pad 14 with respect to abutment, so that in the position in which the current is flowing between the contacts 12, 14, the pole cage 62 can continue its movement without accentuating the pressure on the contact pads 12, 14. The arm 16 is thus pivotally mounted via its cage 62 around a first spindle 68 between the closed position and the open position, and the support 64 of the movable contact 14 is articulated on a second spindle 66 of the pole cage 62.

When closing of the contacts 12, 14 takes place, in a first stage, the pole shaft 20 is therefore made to rotate, and the toggle mechanism drives the contact arm 16 directly. On closing, the two contact pads 12, 14 come into contact. The shaft 20 can then continue its travel, and movement of the pole cage 62 of the arm 16 continues beyond the abutment position, the movable contact 14 "sinking" into the pole cage 62.

Furthermore, in the illustrated embodiment, the toggle system 24, 26 connected to the offset pole shaft 20 enables the movements to be geared-down. Travel of the pole shaft 20 in rotation continues over a large angle $\theta_2$ after closing of the poles. In particular, the total travel $\theta_{final}$ the pole shaft 20, which is fixed and of determined by the design of the apparatus, is about 50 to 55°. At mid-rotation of the shaft 20, the movable contact 14 has already covered ¾ of its travel, and the opening of the contacts is only 10 mm. Therefore, when abutment of the contacts 12, 14 takes place and after a travel $\theta_1$, the shaft 20 preferably still has about 30% of its rotation to perform.

According to the invention, a sensor 70 measures the rotation of the pole shaft 20 between the beginning of movement of the pole shaft 20 and the end of travel of said shaft 20. The end of travel of the pole shaft 20 corresponds to the closed position of the electric contacts. The sensor 70 also measures the rotation $\theta$ of the pole shaft 20 between the moment abutment between the movable and stationary contacts 12, 14 takes place, i.e. the beginning of current flow in the device 10, and the end of travel of the shaft 20 in the closed position.

The method for evaluating the mechanical performances of a switchgear apparatus according to the invention comprises the following successive steps.

A first step consists in measuring the angle of rotation $\theta$ of the axis of the poles 20 during closing of the movable main contacts 12, 14 by the drive mechanism 22.

A second step consists in reconstituting at least two specific values from the measurements made in the previous step.

Figure 5A:
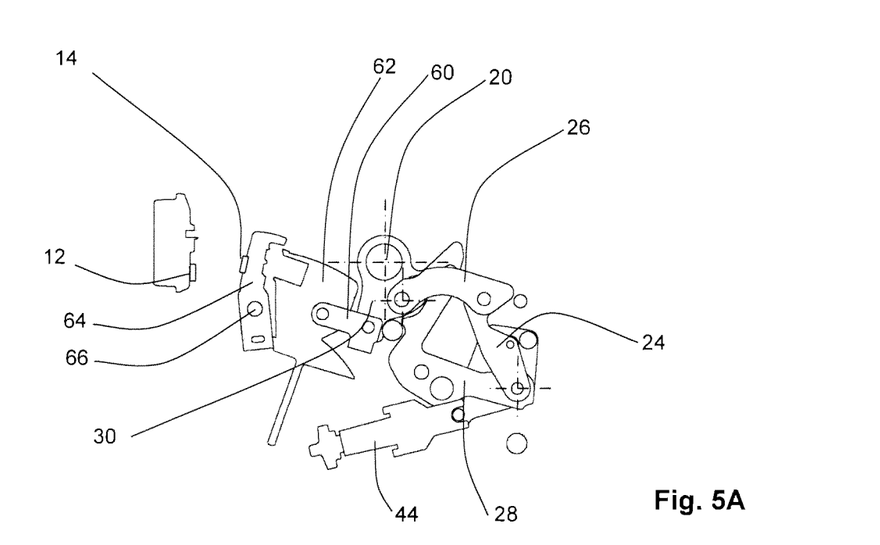
FIGS. 5A-5E show an actuating mechanism according to FIG. 2 in the course of the closing steps.
Figure 5B:
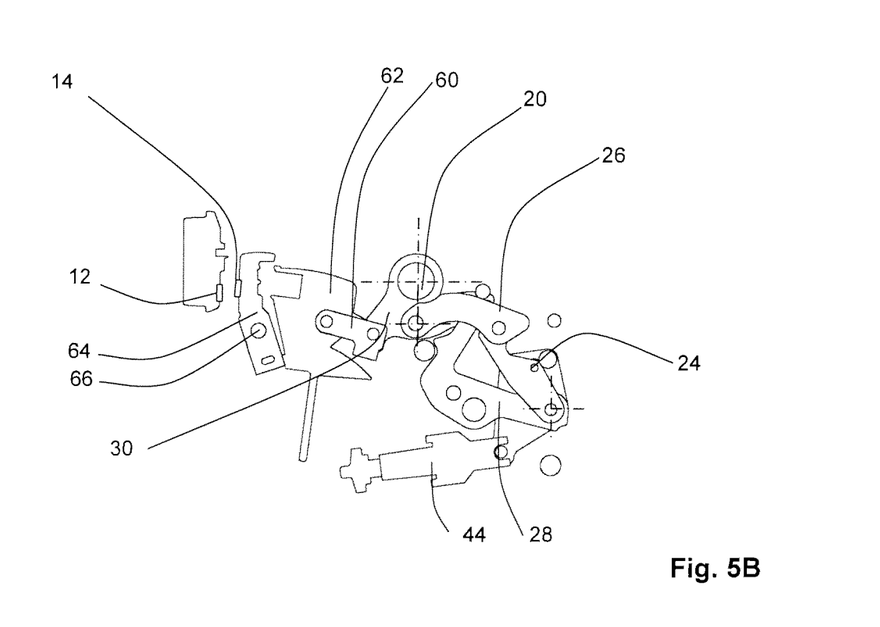
Figure 5C:
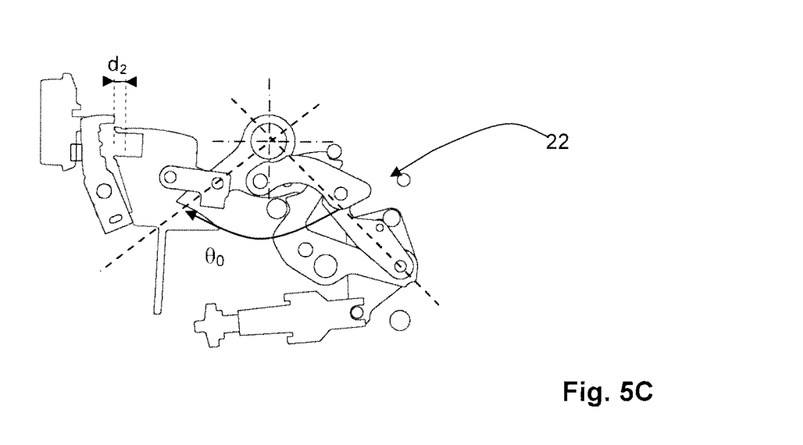
Figure 5D:
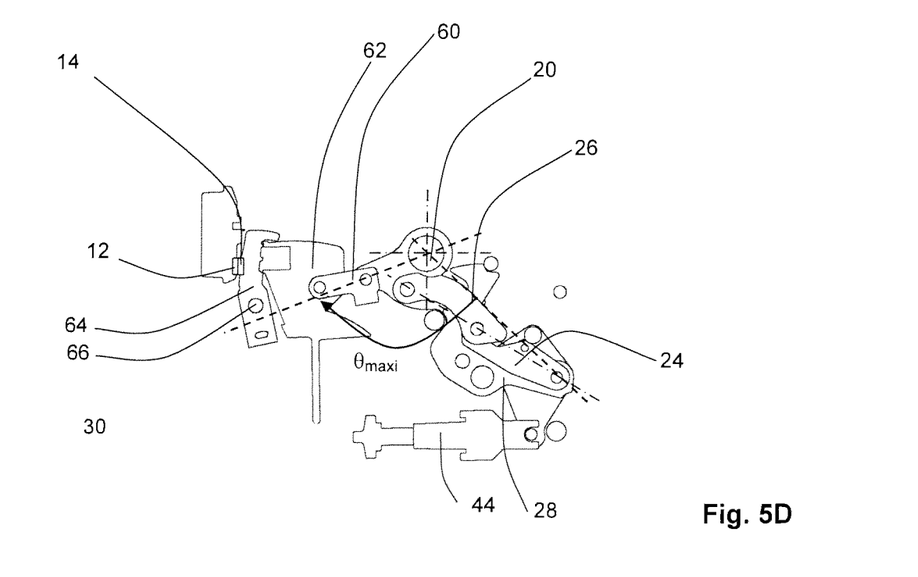
Figure 5E:
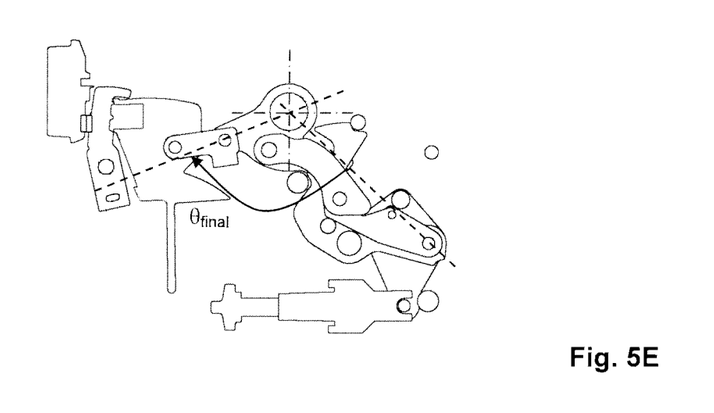
Figure 7:
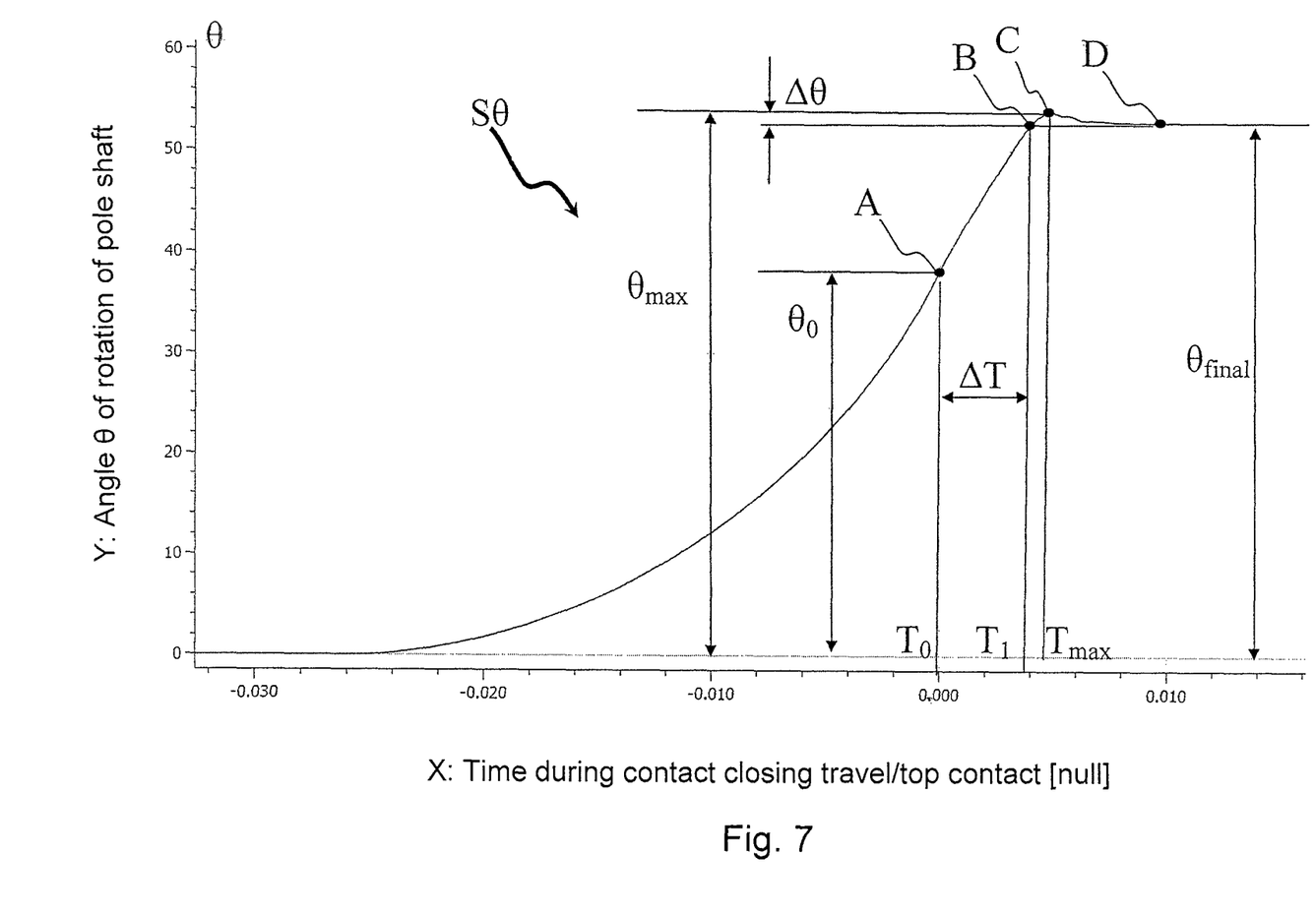
FIG. 7 represents a curve of the variation of the angle of rotation of the contact-support pole shaft of the actuating mechanism in the course of closing.

According to a preferred embodiment of the invention, the method consists in determining a first specific value C on a variation curve $S_\theta$ of the angle of rotation $\theta$ corresponding to a time $T_{max}$ to reach a first local maximum C on the variation curve $S_\theta$. As represented in FIG. 5D, said first local maximum C corresponds to the maximum angle of rotation $\theta_{maxi}$ reached by the pole shaft 20 in the course of closing.

This step corresponds to passage of the top dead point of the toggle device 26, 24 of the drive mechanism 22. After this step, it is no longer the drive lever 40 that pushes the drive mechanism 22, but the pole springs 67 which, by return of force, bring the toggle device 26, 24 to bear on the trip latch 28. A variation of the maximum value of the angle of rotation $\theta_{maxi}$ gives us an indication of the wear of the drive mechanism 22.

The method, according to this preferred embodiment, then consists in determining a second specific value (point D) on the variation curve $S_\theta$. This second specific value (point D) corresponds to a final measured angle of rotation $\theta_{final}$ reached when the pair of movable main contacts 12, 14 are in a closed position.

In a following step, the angular difference $\Delta\theta$ between the maximum angle of rotation $\theta_{maxi}$ and the final measured angle of rotation $\theta_{final}$ is calculated. Determination of this angular difference enables a latched state of a toggle device 26, 24 of the drive mechanism 22 to be diagnosed. Indeed, if the calculated angular difference $\Delta\theta$ is higher than a threshold, in other words if the maximum angle of rotation $\theta_{maxi}$ is greater than the measured final angle of rotation $\theta_{final}$, then the toggle device 26, 24 is latched after it has correctly passed a top dead point (FIG. 5D). If the calculated angular difference $\Delta\theta$ is greater than said latching threshold, the switchgear device is in a latched closed state. The latching threshold corresponds to a characteristic provided by the manufacturer. This theoretical value can also be estimated following a measuring sequence performed when the device is new. The theoretical value is recorded to be used later on in the method according to the invention.

According to a particular embodiment of the invention, the evaluation method consists in determining a third specific value equal to a first time $T_0$ necessary to reach a first inflection point (point A) on a variation curve $S_\theta$ of the angle of rotation $\theta$ (FIG. 7). Said inflection point corresponds to the moment when the pole shaft 20 reaches a maximum speed of rotation. As represented in FIG. 7, the pole shaft 20 has performed a rotation of an angle $\theta_0$. As represented in FIG. 5C, the first inflection point (point A) also corresponds to the moment when the electric contacts 12, 14 come into contact.

From the time the electric contacts 12, 14 come into contact (first inflection point A), movement of the drive mechanism 22 causes compression of the contact springs 67 comprised between the pole cages 62 and the supports 64 of the movable contacts 14. This compression, which is expressed by contact depression, conditions the pressure force which will be exerted on the electric contacts 12, 14 in the closed position. This pressure force also defines the electrodynamic strength of the switchgear apparatus.

The variation of the value of the angle at the moment when the electric contacts 12, 14 come into contact gives an indication on the wear of the switchgear apparatus. No-load or on-load operations of the apparatus do in fact cause wear of the contact pads, whether they be stationary or movable. Removal and crushing of material that results therefrom delays coming into contact of the poles and can result in an increase of the value of the first time $T_0$.

The method consists in determining a fourth specific value equal to a second time $T_1$ necessary to reach a final theoretical angle of rotation $\theta_{final}$ reached when the pair of movable main contacts 12, 14 is in a closed position. The fourth specific value corresponds to the point B on the variation curve $S_\theta$ of the angle of rotation $\theta$. This theoretical reference value of the final angle of rotation is preferably a product characteristic linked to the switchgear device. This characteristic is then provided by the manufacturer. This reference value can also be estimated following a measurement sequence performed when the switchgear device is new. The reference value is recorded to be subsequently used in the method according to the invention.

A following step of the method consists in comparing said specific values with theoretical values extracted from a specific initial operating reference of the switchgear device. According to a preferred embodiment, the method consists in calculating the elapsed time $\Delta T$ between the first and second times $T_0$, $T_1$. This elapsed time between the first and second times $T_0$, $T_1$ is then compared with a reference value representative of operation of a non-worn switchgear device.

This reference value is established according to the "mechanical" configuration of the switchgear device: number of poles, springs of the grenade, and recorded in the information processing module to be used and compared according to the constitution of the switchgear device. This reference value is preferably a product characteristic linked to the switchgear device. This characteristic is then provided by the manufacturer. This reference value can also be estimated following a measurement sequence performed when the switchgear device is new. The reference value is recorded so as to be subsequently used in the method according to the invention.

A last step of the method for evaluating the mechanical performances of a switchgear device consists in diagnosing certain mechanical performances of wear of the drive mechanism 22 according to a comparative state between the determined specific values and the references values provided by the operating reference. According to a preferred particular, the method according to the invention consists in diagnosing an excess energy level of the energy storage system of the drive mechanism 22 according to the difference between the value of the elapsed time calculated with respect to the theoretical reference value.

In other words, the last step of the method according to the invention provides information on the energy reserve available in the grenade to perform closing: the excess energy. If the resistive forces increase, this energy reserve decreases and the angular travel of the pole shaft 20 from the time when the electric contacts 12, 14 come into contact (inflection point A) is increasingly slowed down. The difference ΔT between the value of the elapsed time calculated with respect to the reference value also tends to increase with wear of the switchgear device in the course of use of the latter.

According to a first embodiment, the sensor 70 is preferably located on the pole shaft 20 outside the areas liable to be polluted by debris when current interruptions take place and far away from any possible projections of hot gases. Switchgear apparatuses 10 with high electrodynamic strength have a lifetime of up to thirty years; advantageously, the sensor 70 is of the contact-free type in order to limit any skew due to wear or friction within the sensor 70.

Figures 3, 4:
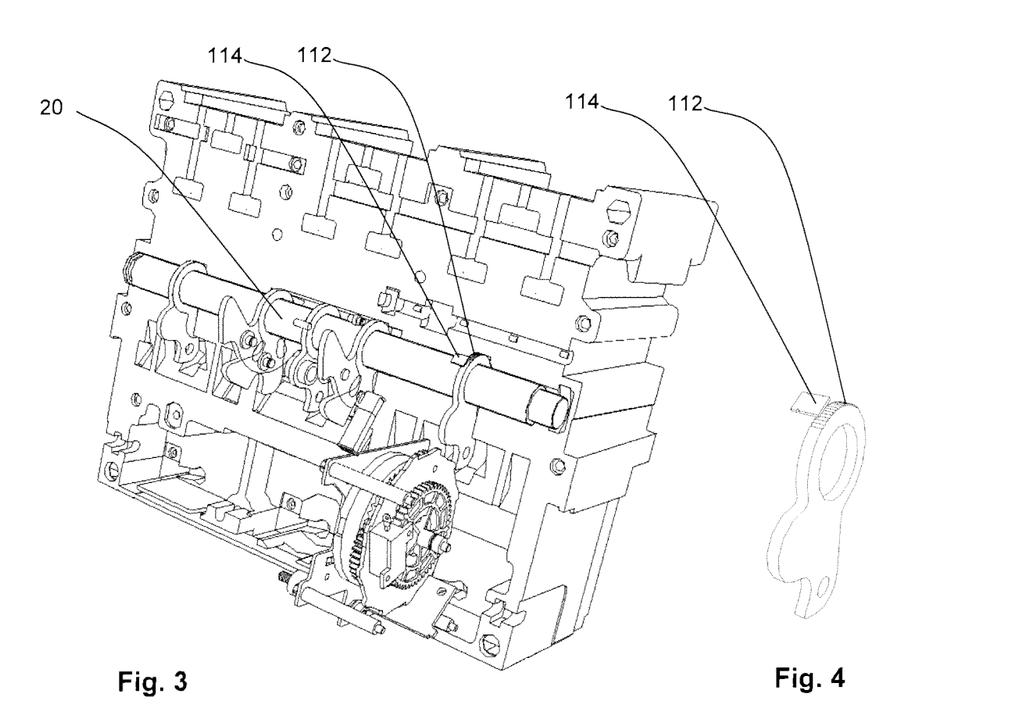
FIG. 3 represents another detailed perspective view of the actuating mechanism of a switchgear device according to FIG. 1.
FIG. 4 represents a detailed perspective view of the rotation sensor of a switchgear device according to FIG. 1.

As represented in FIGS. 3 and 4, the rotation sensor 70 comprises a cog-wheel 112 or a portion of cog-wheel arranged on the pole shaft 20. In another embodiment that is not represented, the wheel is formed by a succession of magnetic poles. Detection means 114 such as microelectronic devices implementing sensitive elements of inductive type, Hall effect cells, or magneto-resistance cells, are fitted on the case of the switchgear device 10, facing the cog-wheel or the magnetic poles. The cog-wheel 112 and detection means 114 communicate without contact. The detection means 114 preferably incorporate numerical processing means of the analog signals generated by passage of the teeth of the cog-wheel or passage of the magnetic poles, to give a numerical transcription thereof in the form of two square signals offset by a quarter of a period. In certain types of embodiment, the detection means can integrate interpolation functions of the analog signals.

According to a particular embodiment of the method, estimation of the contact depression is made by the difference between the final angle $\theta_{final}$ and the angle of rotation of the rotation shaft at the moment the contacts come into contact at the time $T_0$.

Figure 6:
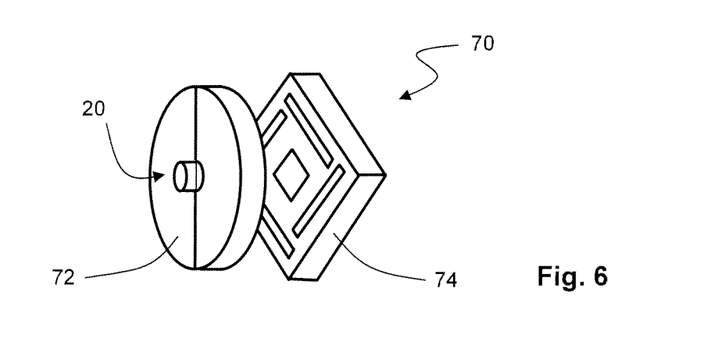
FIG. 6 represents a sensor used in a particular embodiment of the invention.

According to a second particular embodiment that is not represented, the sensor 70, of small volume, is preferably located at the end of the bar 20, for example at an end close to the case of the switchgear device 10. In particular, a sensor of magnetic type without sliding contact, in particular a magnetic array type rotation sensor, is particularly suitable due to its absence of parts liable to wear quickly. As illustrated in FIG. 6, this type of sensor 70 comprises magnetic means 72, in particular a magnet, which can be secured to the element whose rotation is to be determined; in particular, the magnet 72 can be directly coupled on the pole bar 20 by sticking at its end, or any other mechanical means. The sensor 70 further comprises detection means 74, and in particular a detector of printed circuit card type with sides of about 4 mm. The detector 74 is positioned facing the magnetic means 72, for example coupled to the case of the switchgear apparatus 10, in particular fitted in a suitable housing. The detector 74 is connected in conventional manner to means for processing information and presenting results, for example an electronic module already present on the switchgear apparatus 10 to which a new function is added. Advantageously, the sensor 70 is as described in the documents EP 1,830,162 or EP 1,921,423, with an angular resolution of about 0.2 to 0.5°.

Although the invention has been described with reference to contacts 12, 14 of a switchgear device 10 with high electrodynamic strength in which the opening mechanism implies a large variation of the angular position of the pole bar 20 for a small variation of the crushing over-travel, it is not limited thereto: other types of switchgear apparatuses, contactors and/or circuit breakers, can be concerned. If gearing-down of the double connecting rod and toggle amplifies the angular difference depending on whether the contacts are worn or not, on the travel of the contacts and on the precision of the detection device 70, it is possible to apply the device according to the invention to other actuating mechanisms comprising a rotary part.

According to an alternative embodiment of the invention that is not represented, a sensor measures the rotation of the pole cage 62 between the beginning of movement of the pole shaft 20 and the end of travel of said shaft 20. The end of travel of the pole shaft 20 corresponds to the closed position of the electric contacts.

The invention claimed is:

1. A method for evaluating the mechanical performances of a switchgear device which comprises at least one pole, each pole comprising:
   a pair of contacts movable with respect to one another between an open position and a closed position;
   a support arm of a first contact;
   a support arm drive mechanism comprising:
      a rotary pole shaft and at least one rod which pivotably couple the drive mechanism to the support arm,
      an energy storage system for moving said arm to place the main contacts in a closed position; and
      a toggle device associated with a trip latch;
   the method comprising:
      measuring the angle of rotation of the pole shaft during a closing travel of the contacts;
      deriving at least two specific values from measuring the angle of rotation;
      comparing said specific values with a specific initial operating reference value of the switchgear device;
      identifying the mechanical wear performances of the drive mechanism by comparing the specific values obtained with the operating reference value;
      determining a first specific value on a variation curve of the angle of rotation corresponding to a time to reach a first local maximum on the variation curve, said first local maximum corresponding to the maximum angle of rotation reached by the pole shaft during closing travel of the contacts;
      determining a second specific value on the variation curve of the angle of rotation corresponding to a final angle of rotation reached when the pair of movable contacts is in a closed position;
      calculating the angular difference between the maximum angle of rotation and the final angle of rotation;
      identifying a latching state of the toggle device as a function of said angular difference.

2. The method for evaluating according to claim 1, comprising:
- determining a third specific value equal to a first time necessary to reach a first inflection point on a variation curve of the angle of rotation, said inflection point corresponding to the moment when the pole shaft reaches a maximum speed of rotation;
- determining a fourth specific value equal to a second time necessary to reach a point corresponding to a theoretical final angle of rotation reached when the pair of movable contacts are in a closed position;
- calculating the elapsed time between the first and second times; and
- identifying an excess energy level of the energy storage system of the drive mechanism as a function of the difference between the value of the calculated elapsed time and a theoretical elapsed time value.

3. The method for evaluating according to claim 1, comprising determining the angle of rotation of the pole shaft, by a rotation sensor one component of which is located on the pole shaft.

4. The method for evaluating according to claim 3, wherein the rotation sensor comprises magnetic means arranged on the axis of rotation of the pole shaft, and detection means on the switchgear device, the magnetic means and detection means communicating with each other without physically contacting each other.

* * * * *